(12) United States Patent
Castleman

(10) Patent No.: US 12,189,120 B2
(45) Date of Patent: Jan. 7, 2025

(54) HIGHLY INTERACTIVE HEAD MOUNT DISPLAY ENVIRONMENT FOR GAMING

(71) Applicant: Sony Interactive Entertainment Inc., Tokyo (JP)

(72) Inventor: Dennis Castleman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 231 days.

(21) Appl. No.: 17/199,886

(22) Filed: Mar. 12, 2021

(65) Prior Publication Data

US 2021/0349310 A1 Nov. 11, 2021

Related U.S. Application Data

(60) Provisional application No. 63/022,708, filed on May 11, 2020.

(51) Int. Cl.
| | | |
|---|---|---|
| *G02B 27/00* | (2006.01) | |
| *G01S 17/894* | (2020.01) | |
| *G02B 27/01* | (2006.01) | |
| *G02B 27/09* | (2006.01) | |

(52) U.S. Cl.
CPC ........ *G02B 27/0093* (2013.01); *G01S 17/894* (2020.01); *G02B 27/017* (2013.01); *G02B 27/0916* (2013.01); *G02B 2027/0178* (2013.01)

(58) Field of Classification Search
CPC .................................................. G02B 27/0093
See application file for complete search history.

(56) References Cited

U.S. PATENT DOCUMENTS

| | | | |
|---|---|---|---|
| 6,485,413 B1 | 11/2002 | Boppart et al. | |
| 11,048,091 B1* | 6/2021 | Lansel | G02B 6/0036 |
| 2007/0112444 A1* | 5/2007 | Alberth, Jr. | G01C 21/365 |
| | | | 700/32 |
| 2010/0149073 A1* | 6/2010 | Chaum | G02B 27/017 |
| | | | 345/8 |
| 2011/0018903 A1 | 1/2011 | Lapstun et al. | |
| 2012/0092328 A1 | 4/2012 | Flaks et al. | |
| 2013/0300637 A1* | 11/2013 | Smits | G02B 30/26 |
| | | | 345/8 |
| 2015/0016777 A1* | 1/2015 | Abovitz | G02B 27/0093 |
| | | | 385/37 |
| 2017/0039959 A1* | 2/2017 | Mallinson | G06F 3/0325 |
| 2017/0199584 A1* | 7/2017 | Mallinson | G09G 3/025 |
| 2018/0129058 A1* | 5/2018 | Morrison | G02B 26/101 |
| 2019/0278091 A1 | 9/2019 | Smits et al. | |
| 2020/0371357 A1* | 11/2020 | Choi | G02B 27/0176 |

OTHER PUBLICATIONS

"International Search Report and Written Opinion" dated Jul. 27, 2021, from the counterpart PCT application PCT/US21/28341.

* cited by examiner

*Primary Examiner* — William Boddie
*Assistant Examiner* — Andrew B Schnirel
(74) *Attorney, Agent, or Firm* — John L. Rogitz; John M. Rogitz

(57) ABSTRACT

An assembly includes a movable laser projector configured to project images and to also act as a mapping apparatus such as a LIDAR apparatus configured to generate a data structure representing a three-dimensional map of a space. A head mount (HM) includes a camera to generate signals representing the gaze direction of the wearer of the HM. The laser projector moves according to the signals to project images in the space using the data structure generated by the mapping apparatus.

13 Claims, 7 Drawing Sheets

HIGHLY INTERACTIVE HEAD MOUNT DISPLAY ENVIRONMENT FOR GAMING

FIELD

The application relates generally to interactive display environments for gaming.

BACKGROUND

Computer simulations such as computer games frequently employ head-mounted displays (HMD) for purposes of presenting virtual reality (VR) and augmented reality (AR) experiences. As understood herein, as computer games grow more sophisticated, greater interactivity in the real world in which an AR or VR game is being played may be desirable.

SUMMARY

In example implementations, a galvanometer or similar device steers the image from a laser projector to various locations within a room to build a 3D model of the room the device is in. A headband or other head mount may incorporate multiple cameras for pupil tracking and positional tracking along with an IMU for positional tracking. An interactive display environment for gaming can be created using these elements in combination.

Accordingly, an assembly includes a laser projector configured to project images. The assembly further includes a waveguide configured to redirect light from the laser projector to generate a data structure representing a three dimensional map of a space, and at least one head mount (HM) with at least one camera to generate signals representing a gaze direction of a wearer of the HM. The waveguide is configured to move according to the signals to project images in the space using the data structure.

The data structure may be generated using light detection and ranging (LIDAR) or structured light.

The waveguide may include one or more galvanometers, one or more mirrors, one or more deformable lenses, and combinations thereof.

The HM may include at least one inertial measurement unit (IMU) to generate signals representing a location of the HM in the space. The waveguide can be operably associated with at least one processor configured to receive the signals from the IMU and camera and cause the waveguide to move in accordance therewith.

In another aspect, an assembly includes a movable laser projector assembly configured to project images in a space, and at least one head mount (HM) with at least one camera to generate signals representing a gaze direction of a wearer of the HM. The laser projector assembly is configured to move according to the signals to project images in the space.

In another aspect, a method includes generating a data structure representing a map of a room, tracking a gaze of a wearer of a head mount (HM), and moving light from a laser projector to project images in the room according to the gaze and the data structure.

The details of the present application, both as to its structure and operation, can best be understood in reference to the accompanying drawings, in which like reference numerals refer to like parts, and in which:

DETAILED DESCRIPTION

Figure 1:
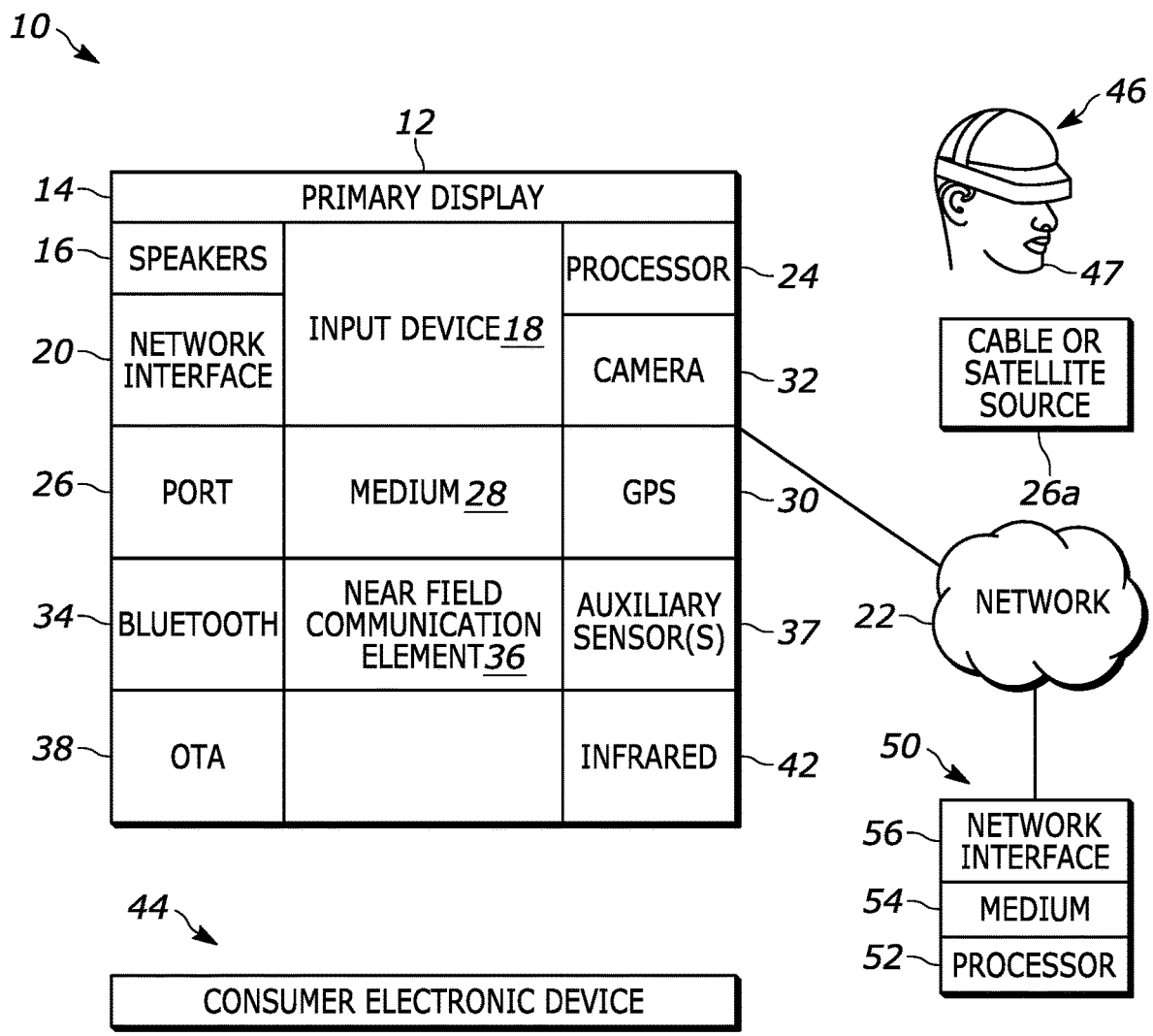
FIG. 1 is a block diagram of an example system including an example in accordance with present principles.

This disclosure relates generally to computer ecosystems including aspects of consumer electronics (CE) device networks such as but not limited to computer game networks. A system herein may include server and client components including HMDs which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc. or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be any conventional general-purpose single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or, the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player or an HMD worn by a player 47. In the example shown, only two CE devices 44, 46 are shown, it being understood that fewer or greater devices may be used. A CE device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or, the server 50 may be implemented by one or more game consoles or other computers in the same room as the other devices shown in FIG. 1 or nearby.

Figure 2:
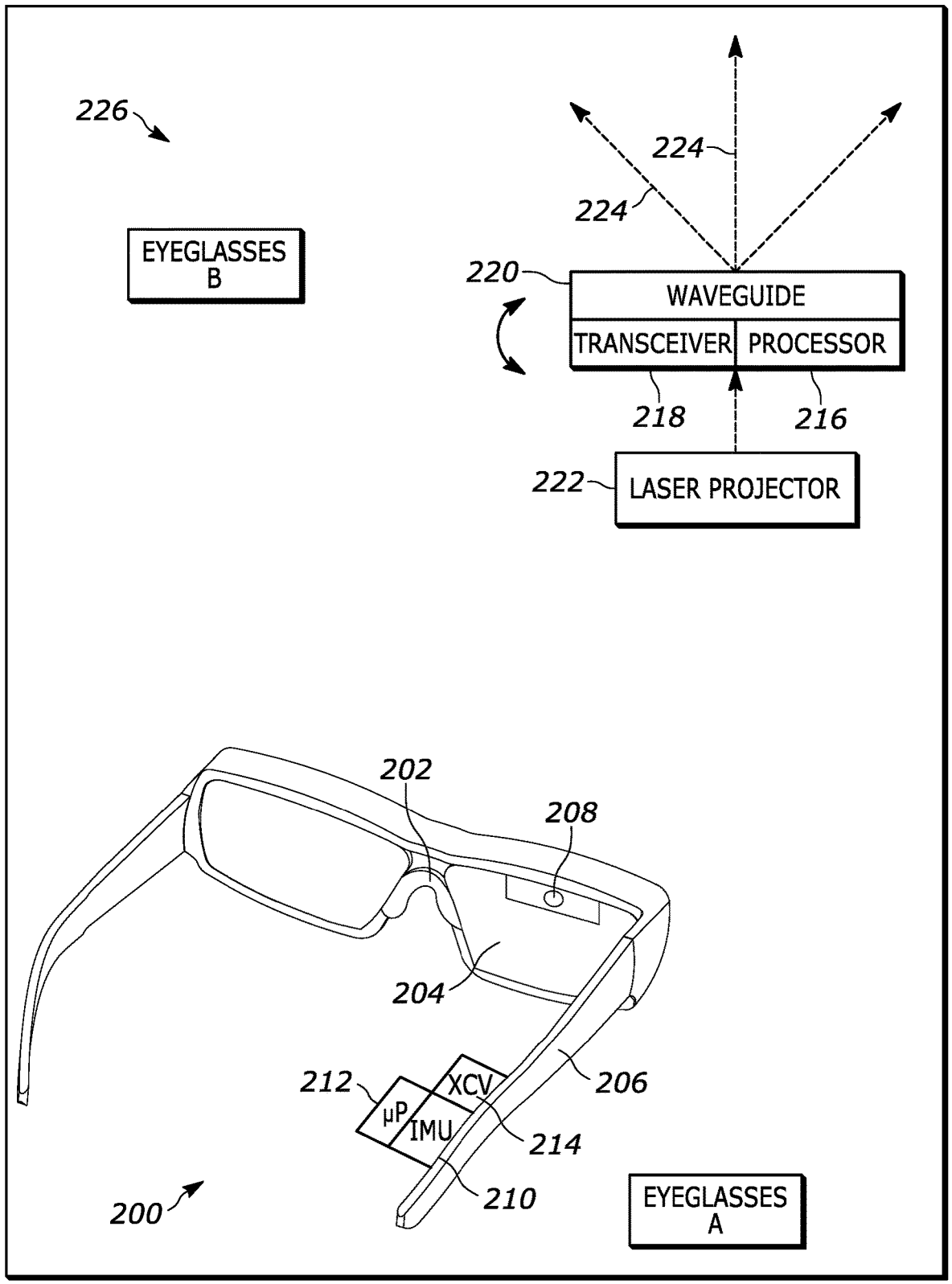
FIG. 2 is an illustration of a system in a room with a combined laser projector/LIDAR projector, and a head mount (HM) configured as eyeglasses.

FIG. 2 illustrates an example non-limiting embodiment of a head mount (HM) 200 configured as eyeglasses, with a nose bridge 202 supporting left and right view openings 204, which may be filled with respective lenses, and left and right temples 206. Other configurations of HM may be used, e.g., headbands, augmented reality head-mounted displays, etc.

The HM 200 may include one or more cameras 208 positioned to produce images of the eyes of a wearer of the HM 200. The HM 200 also may include one or more inertial measurement units (IMU) 210 to sense and output signals of a body's specific force, angular rate, and sometimes the orientation of the body, using a combination of accelerometers, gyroscopes, and sometimes magnetometers. One or more processors 212 may communicate with the camera 208 and IMU 210 and communicate wirelessly with other devices using one or more wireless transceivers 214.

For example, the processor 212 may communicate with a waveguide processor 216 via a waveguide transceiver 218 to move a waveguide 220 such as one or more galvanometers, mirrors, deformable fisheye lenses, etc. to redirect light from a laser projector 222 as indicated by the arrows 224. The laser projector 222 itself may be stationary if desired. In this way, light from the laser projector 222 can be directed to selective regions in a room 226 in which the laser projector 222 is disposed in accordance with principles set forth herein. Multiple users may be accommodated as disclosed herein so that multiple sets of HMs may be present, including, e.g., a "B" set of eyeglasses 228 that in construction and operation may be substantially identical to the HM 200.

Figure 3:
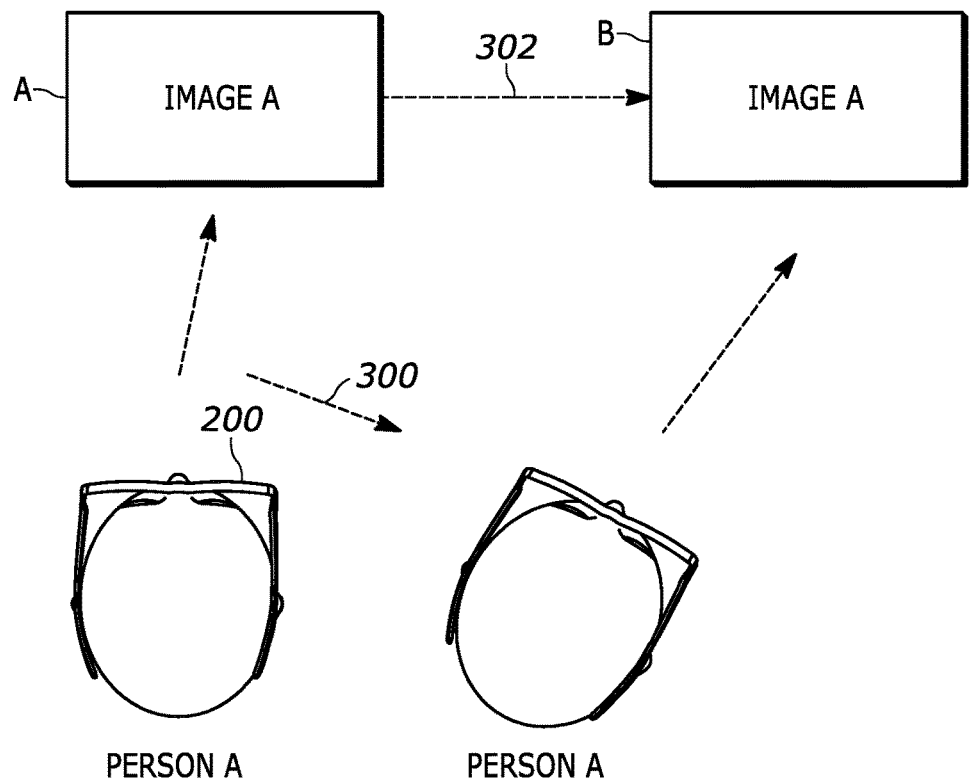
FIG. 3 illustrates the projected image moving as a user wearing the HM moves.
Figure 4:
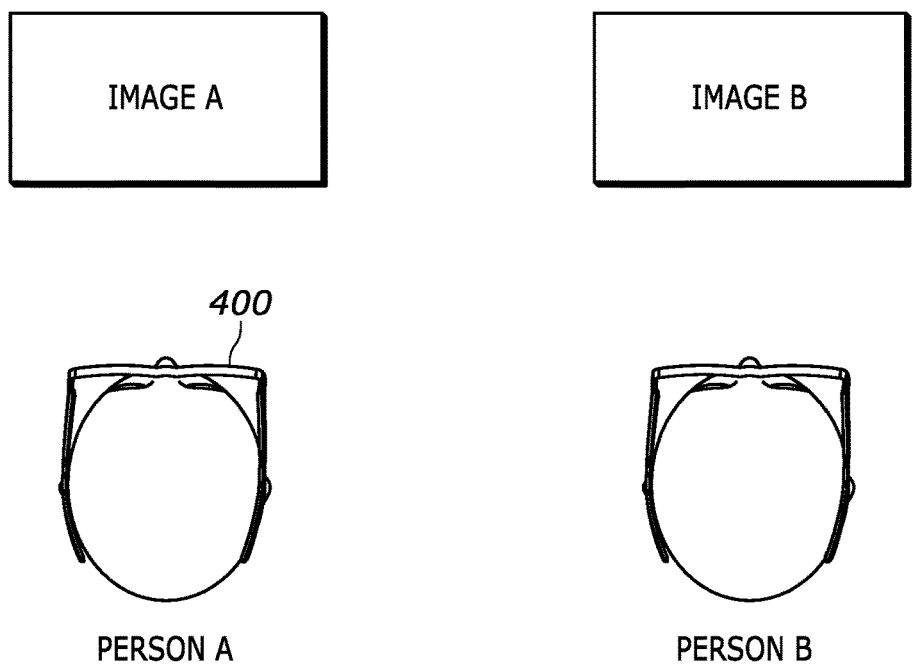
FIG. 4 illustrates two users viewing respective projected images in the same room.

Indeed, FIG. 4 illustrates such a multi-user scenario. However, referring first to FIG. 3, a single person "A" may gaze toward a region A in the room 226, wearing the HM 200. The location of the user and direction of gaze are determined using output of the IMU 210 and camera 208. The HM 200 communicates this information to the waveguide processor 216 (and to processing circuitry in the laser projector 222 if desired) which causes the waveguide 220 to be moved to redirect an image "A" from the laser projector 222 into the region A as shown.

Should the person A turn his gaze toward a region B in the room as indicated by the arrow 300, the waveguide 220 is moved to redirect the image A from the projector into the region B as indicated by the arrow 302. In this way, the image from the projector is moved around the room to appear in the field of view (FOV) defined by the gaze of the person A.

FIG. 4 illustrates two users labeled person A and person B, each wearing a respective HM 400. In FIG. 4, an image A is presented in a region of the room in the FOV of the person A whereas a different image B is presented in a different region of the room in the FOV of the person B.

It is to be appreciated that in this way, a single laser projector may be able to present, for example, a first video to the person A in the FOV of the person A while simultaneously presenting a different video in the FOV of the person B.

This may be facilitated by using a scanning laser at 120 Hz or higher (e.g., 240 Hz). The waveguide 220 in effect is moved to multiplex images from the projector between the two regions at 60 Hz each. The laser projector 222 in every odd cycle for example may project the image A, which is redirected to the FOV of the person A by the waveguide 220, and then in every odd cycle generate the image B, which is redirected to the FOV of the person B by the waveguide 220. These principles may apply to more than two people viewing respective different images in their respective FOVs.

Figure 5:
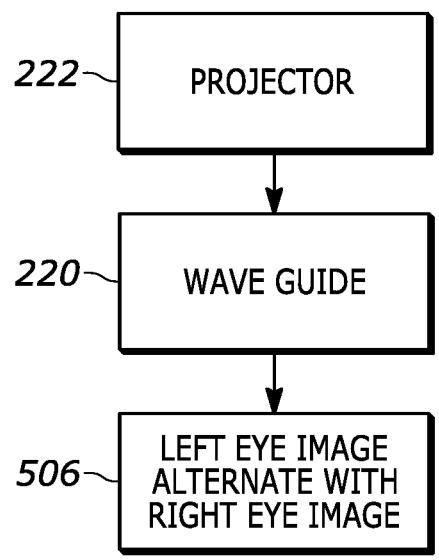
FIG. 5 illustrates an example HM with shutters or active polarization to achieve a 3D effect.
Figure 5:
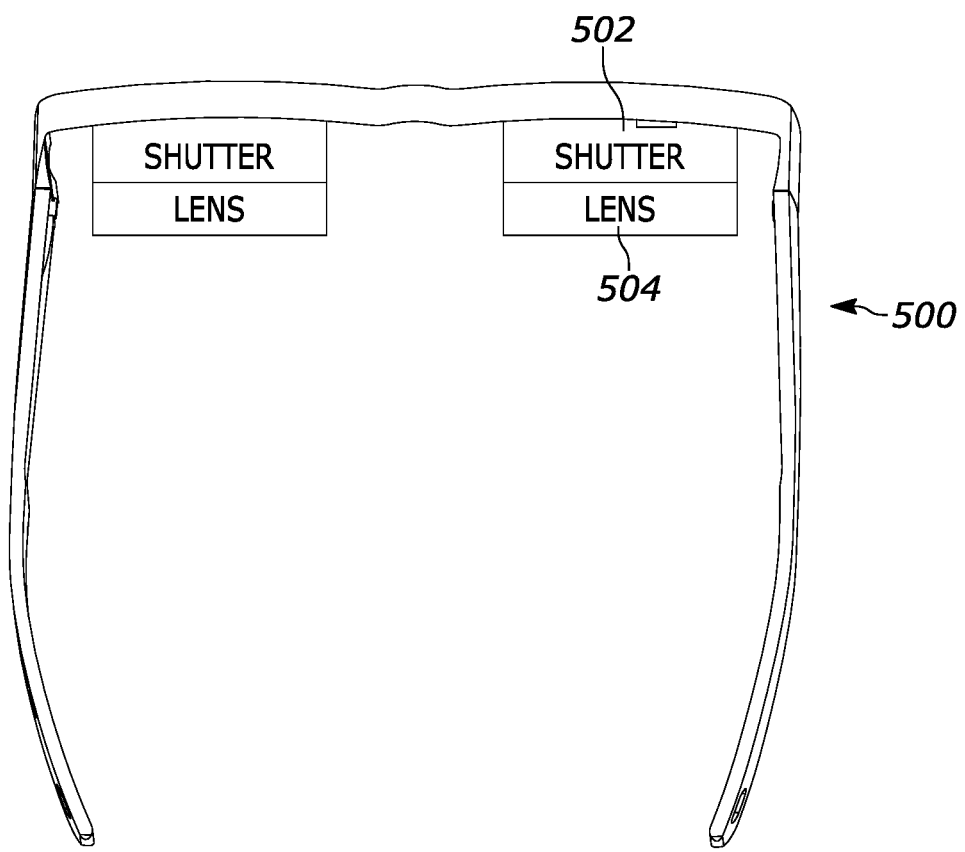

FIG. 5 illustrates a HM 500 that may be substantially identical in configuration and operation to the HM 200 in FIG. 2, with the following exceptions. The HM 500 in FIG. 5 may employ shutters 502 such as liquid crystal display (LCD) shutters in front of each eye opening or lens 504. Every other projection cycle the laser projector 222 may project a left eye image and in between a right image, with the left eye shutter 502 being closed and the right eye shutter being open when the right eye image is projected and vice-versa when the left eye image is projected, as indicated in the projection region 506 illustrated in FIG. 5. Or, each lens 504 may be an active polarization lens with different polarizations from each other, with the polarization of light from the laser projector 222 being configured to match the polarization of the left eye lens 504 when the left eye image is being projected and then changed to match the polarization of the right eye lens 504 when the right eye image is being projected in the alternating cycles.

Figure 6:
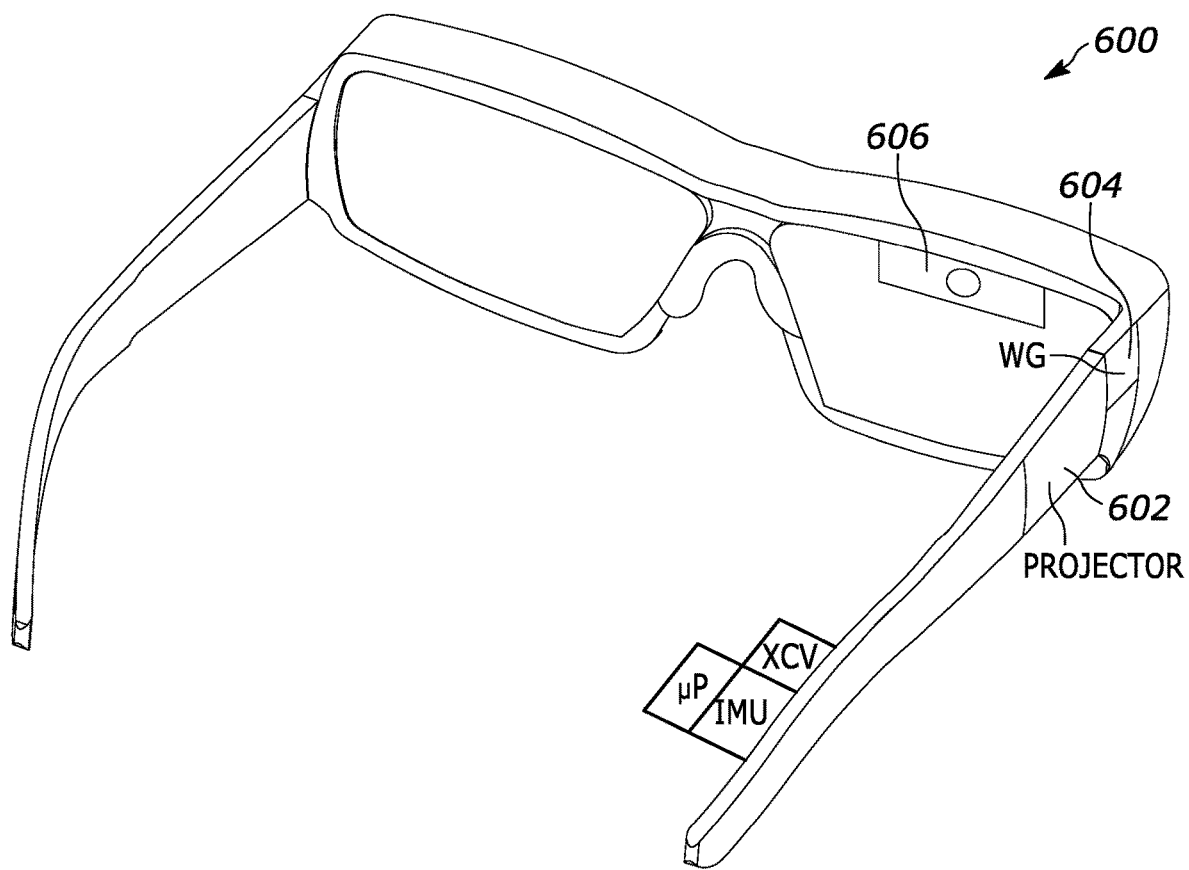
FIG. 6 illustrates an example HM in which the projector is mounted on the HM.

FIG. 6 shows yet another HM 600 that may be substantially identical in configuration and operation to the HM 200 in FIG. 2, with the following exceptions. Instead of a remote laser projector, a laser projector 602 is mounted on the HM 600 in FIG. 6 pointing straight in front of the wearer as defined by the frame of the HM 600. The laser projector 602 thus can project light along the FOV of the wearer when the wearer is gazing straight ahead. A waveguide 604 may be employed to redirect the image from the laser 602 if desired when the wearer glances sidelong as detected by the camera 606 of the HM 600. Image stabilization techniques used in digital cameras may be implemented to stabilize the image from the laser on the wall of the room.

Figure 7:
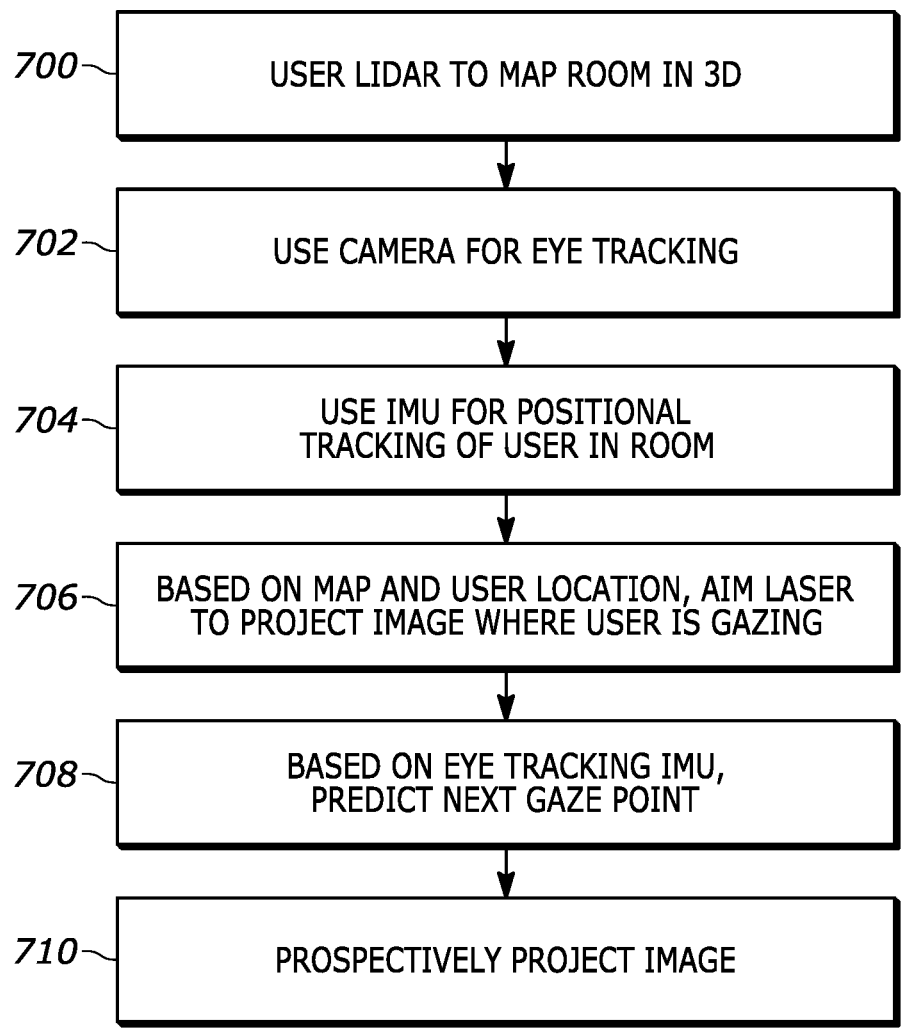
FIG. 7 is a flow chart of example logic consistent with present principles.

FIG. 7 illustrates example logic. Commencing at block 700, the room 226 in FIG. 2 is mapped. This mapping may be done using light direction and ranging (LIDAR) techniques, structured light mapping techniques, or other techniques such as one or more of those disclosed in commonly owned U.S. Pat. No. 9,854,362 and U.S. patent application Ser. No. 16/216,725, both of which are incorporated herein by reference. The mapping may be done using a mapping apparatus different from the laser projector 222, or it may be done using the laser projector 222 in a mapping mode.

During operation, images from HM camera 208 are used to track the user's gaze while at block 704 signals from the HM IMU 210 are used to track the user's position and/or orientation in the room 226. Moving to block 706, based on the map from block 700 and the information from blocks 702 and 704, the waveguide 220 is configured to direct the image from the laser projector 222 onto a region of the room in the user's FOV, i.e., at which the user is looking.

If desired, based on eye tracking an IMU input and rates of change, the logic may, at block 708, predict the next region in the room at which the user might look. At block 710 the image from the laser projector may be prospectively projected into the next region while continuing to project the image into the current region using multiplexing principles described herein. For example, using a 120 Hz laser the image may be projected at 60 Hz into both the current and next regions.

Figure 8:
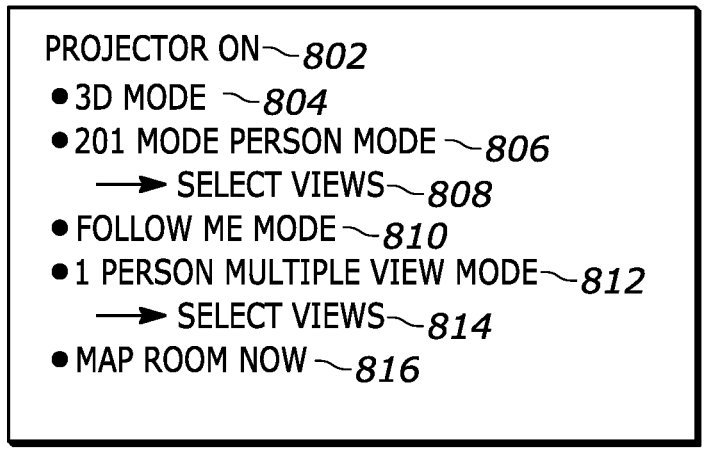
FIG. 8 is a screen shot of an example user interface (UI) consistent with present principles.

FIG. 8 illustrates an example user interface (UI) 800 that may be presented on any of the displays herein, in one or more UI pages. An on/off selector 802 may be provided to enable or disable the projection of images from the laser projector 222. A 3D mode selector 804 may be provided to enable and disable the logic attendant to FIG. 5. A multi-user selector 806 may be provided to enable and disable the logic attendant to FIG. 4. When FIG. 4 is enabled, one or more view selectors 808 may be provided to enable the users to select what videos or text pages or other images they wish to have presented in their respective FOVs.

A follow me mode selector 810 may be provided to enable and disable the logic attendant to FIG. 3. Further, a single person, multi-view mode may be provided to enable and disable logic similar to FIG. 4 except that only a single person is involved and may select, using a view selector 814, what videos or text pages or other images he wishes to have presented in respective regions of the room 226, so that the single user can look from one region to another to view multiple pages of, for instance, a document as if the user had multiple pages of the document spread on various locations in the room.

A map selector 816 may be presented to cause the laser projector 222 to generate a map of the room 226 using LIDAR or structure light or other appropriate mapping technique.

Figure 9:
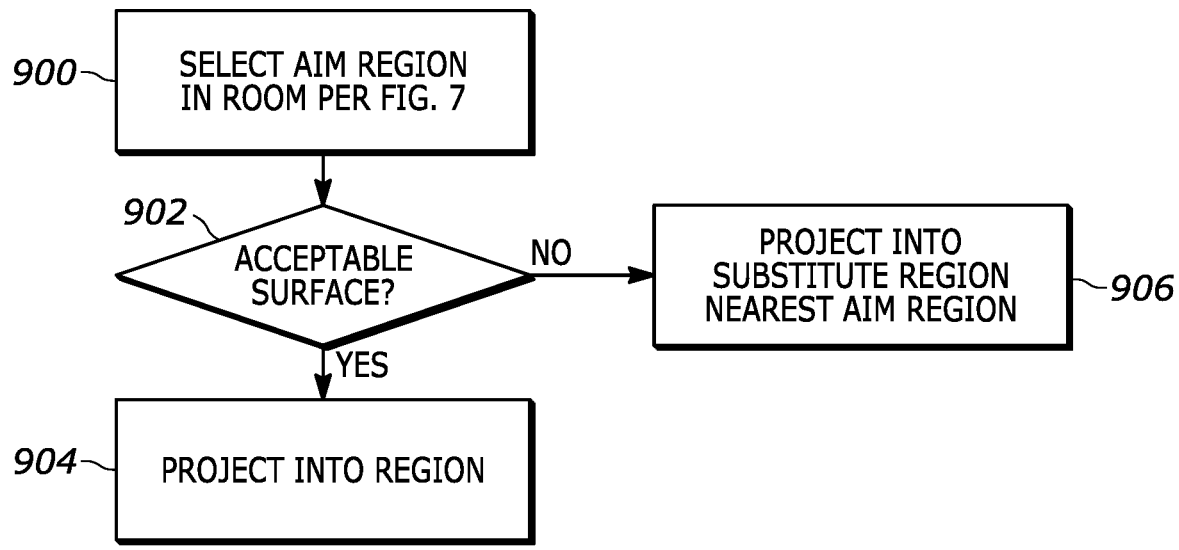
FIG. 9 is a flow chart of further example logic consistent with present principles.

FIG. 9 illustrates that in mapping the room 226, certain regions of the room, such as doors and windows, may be detected that are not suitable for image projection. Thus, at block 900, a region for projection may be selected according to, for instance, the logic of FIG. 7. Proceeding to decision diamond 902, it may be determined whether the region includes an acceptable surface for reflecting projection of laser light, and if so the image from the laser projector is directed into the region at block 904 by appropriately configuring the waveguide 220.

On the other hand, if the region is determined not to be acceptable, the logic moves to block 906 to configure the waveguide 220 to directed light from the laser into a substitute region that may be closest region to the region identified at block 900 having an acceptable projection surface.

In determining whether a region is acceptable, during mapping, image recognition may be used on reflected light and regions correlated, using a data structure correlating reflection characteristics to projection reflection suitability, to "acceptable" or "not acceptable" according to the reflection characteristics of the respective regions. Machine learning may be used for this purpose by training a neural network system of other machine learning system on a database of known surface types correlated to reflection characteristics.

It will be appreciated that whilst present principals have been described with reference to some example embodiments, these are not intended to be limiting, and that various alternative arrangements may be used to implement the subject matter claimed herein.

What is claimed is:

1. An assembly, comprising:
a laser projector configured to project images;
a waveguide configured to redirect light to generate a data structure representing a three-dimensional map of a space;
at least one head mount (HM) with at least one sensor to generate signals representing a gaze direction of a wearer of the HM, the waveguide being configured to move according to the signals to project images in the space using the data structure; and
at least one processor for controlling the waveguide and programmed with instructions to:
based at least in part on the data structure representing the three-dimensional map of the space, identify that at least a first region in the space and distanced from the HM and identified by the signals representing the gaze direction of the wearer of the HM is not suitable for presenting the images; and
responsive to identifying that the first region is not suitable for presenting images, control the waveguide to direct the images onto a second region in the space.

2. The assembly of claim 1, wherein the data structure is generated using light detection and ranging (LIDAR) or structured light.

3. The assembly of claim 1, wherein the waveguide comprises at least one galvanometer.

4. The assembly of claim 1, wherein the waveguide comprises at least one mirror.

5. The assembly of claim 1, wherein the waveguide comprises at least one deformable lens.

6. The assembly of claim 1, wherein the HM comprises at least one inertial measurement unit (IMU) to generate signals representing a location of the HM in the space.

7. The assembly of claim 6, wherein the waveguide is operably associated with at least one processor configured to receive the signals from the IMU and camera and cause the waveguide to move in accordance therewith.

8. An assembly, comprising:
a movable laser projector assembly configured to project images in a space;
at least one head mount (HM) having at least one sensor to generate signals representing a gaze direction of a wearer of the HM, the laser projector assembly being configured to move according to the signals to project images in the space; and
at least one processor programmed to:
based at least in part on a data structure representing a three-dimensional map of a space in which the HM is disposed, identify that at least a first region in the space and distanced from the HM and identified by the signals representing the gaze direction of the wearer of the HM is not suitable for presenting the images; and
responsive to identifying that the first region is not suitable for presenting images, cause the images to be directed onto a second region in the space.

9. The assembly of claim 8, wherein the laser projector assembly comprises:
a laser projector; and
a waveguide configured to redirect light from the laser projector to generate a data structure representing a three-dimensional map of a space, the waveguide being configured to move according to the signals to project images in the space using the data structure.

10. The assembly of claim 9, wherein the waveguide comprises a galvanometer.

11. The assembly of claim 9, wherein the map of the space is generated using light detection and ranging (LIDAR) or structured light.

12. The assembly of claim 8, wherein the HM comprises at least one inertial measurement unit (IMU) to generate signals representing a location of the HM in the space.

13. The assembly of claim 12, wherein the laser projector assembly is operably associated with at least one processor configured to receive the signals from the IMU and camera and cause the laser projector assembly to move in accordance therewith.

* * * * *